UNITED STATES PATENT OFFICE.

SANFRID WILGOTT BERGLUND, OF STOCKHOLM, SWEDEN.

ARTIFICIAL STONE.

No. 904,923.          Specification of Letters Patent.          Patented Nov. 24, 1908.

Application filed March 23, 1906. Serial No. 307,669.

*To all whom it may concern:*

Be it known that I, SANFRID WILGOTT BERGLUND, a subject of the King of Sweden, and resident of Stockholm, in the Kingdom of Sweden, have invented certain new and useful Improvements in the Manufacture of Artificial Stone, of which the following is a specification.

This invention relates to certain improvements in the manufacture of artificial stone, and more particularly such artificial stone as is produced from lime and sand, and the object of the invention is to provide a process of a novel and improved nature, whereby a stone of great strength and density may be produced in a simple, convenient and economical manner, with a minimum consumption of lime, and without necessitating the application of pressure, or the employment of costly and complicated apparatus.

In carrying out the invention in practice, good results may be attained by the employment of from 96 to 98 parts of clean or washed sand with from 4 to 2 parts of lime. The lime is mixed with water to produce a thin milky liquid, after which the sand is added or stirred into the liquid until a mass is produced of about the consistency of mortar. When the ingredients are mixed in this manner, the grinding of the dry lime is avoided, and the sand, if previously washed, may be employed while still wet, a material advantage being thereby afforded, since a clean and sharp condition of the sand may be insured without inconvenience. The mortar-like mass is then poured into molds, and is permitted to remain therein until it shall have set, during which time the sand particles are caused to settle compactly and produce a dense, homogeneous texture throughout the entire mass, the finer or smaller particles of sand penetrating into the interstices between the larger sand particles, so as to produce an extremely fine and uniform texture throughout the entire mass, without necessitating any preliminary milling of the materials employed.

The consistency to which the mortar-like mass is mixed prior to its introduction into the molds may be varied to a certain extent, but in no case should such mass be of such thick or stiff consistency as to interfere with the settling and compacting of the sand particles during the setting of the mass in the molds as above described. It may be stated, however, that when a smooth surfaced product is desirable, the mass should be more fluid than where a rough surfaced product is desired, the greater proportion of water contained therein facilitating the settling or compacting of the particles necessary for assuring a smooth surfaced product.

During the time required for the setting of the mortar-like mass in the molds, and for the compacting of the sand particles, as above described, a certain proportion of the water will collect at the tops of the molds, dependent upon the consistency to which the mortar-like mass is mixed, and if sectional molds be employed, other water may escape at crevices between the mold sections, but such crevices should not be sufficiently large to drain the molds during the setting and compacting of the mass therein.

During the setting of the mortar-like mass in the molds and the settling and compacting of the sand particles thereof as above described, no pressure is exerted upon the mass, and consequently substantially all of the water with which such mass is charged will be retained by the mass. This retention of a comparatively great proportion of water within the mass after the same shall have become set is a matter of material importance in the present invention, as will be hereinafter explained. The discharge of such excess water as may collect at the tops of the molds or escape through the crevices of the mold sections during the setting of the motar-like mass will not, however, usually interfere with the practical carrying out of the invention, since an ample proportion of water will still be retained in the mass.

After the mass within the molds shall have set, and the sand particles shall have become compacted, as above described, and while the mass within the molds is still moist and wet by reason of its contained water, the molds are introduced into a hardening apparatus of any preferred kind, wherein the moist mass in said molds is subjected to a temperature of from about 150° C. to 180° C. for about ten hours, during which time the water contained in the mass is caused to act upon the silica of the sand in the presence of the lime, to produce a jelly-like substance, which forms within and fills the interstices between the sand particles, and hardens in such a manner as to effectively bind the closely compacted particles together.

The subjection of the mass in the molds to the heat of the hardening apparatus while still wet with its contained water as above described, insures the production of the jelly-like binding substance in comparatively large volume, and when the sand particles are closely compacted by settling, as above described, the hardening of this binding substance will serve to occlude the pores or interstices which would otherwise be present, so that upon the completion of the hardening process, and the removal of the molded blocks from the molds, such blocks will present great density and strength, and will be rendered more durable and otherwise better adapted for use by reason of their impermeability.

The mixing of the lime with water as above described, prior to the incorporation of the sand to produce the mortar-like mass, insures uniformity of result throughout the entire mass, the lime being thereby more uniformly and thoroughly distributed than would be possible were the lime and sand mixed in a dry state, a material economy being thereby attained in the consumption of lime, while at the same time greater density and uniformity of structure is afforded, and greater strength and durability of the finished product assured. Furthermore, the large proportion of water contained in the mass prior to the hardening thereof insures protection against the formation of calcium carbonate and consequent waste of lime from absorption of carbonic acid from the air, and also insures the loosening of dirt and impurities adherent to the sand particles, and thereby materially increases the strength of the product.

It is not usually necessary to sift or otherwise select the sand for employment according to my invention, since there will generally be sufficient variation in the size of the particles to assure good results, particularly when the consistency of the mortar-like mass is regulated, as above described, with a view to permitting more or less settling and compacting of the sand particles during the setting of the mass in the molds.

In methods hitherto employed for the manufacture of artificial stone, from seven to eight per cent. of lime is commonly employed, while according to my invention only from two to four per cent. is required, and at the same time greater strength and density of the product is assured. Theoretically, only from one to two per cent. of lime is actually necessary for the formation of the binding substance, and the present invention permits of attaining practical results with a proportion of lime not in excess of four per cent., thereby affording a very important economy in the manufacture. Furthermore, the employment of my present improvements permits of dispensing with the employment of the costly apparatus commonly used for grinding, mixing and pressing the materials, and necessitates no drying of the molded product prior to the hardening of the same, so that the cost of the plant and the labor required is materially lessened. Good results may also be attained by mixing the sand and lime simultaneously with the water, and also by mixing the sand with the water prior to the incorporation of the lime. Where quicklime is employed, it is usually preferable to slake it prior to stirring in the sand.

Having thus described my invention, what I claim and desire to secure by Letters Patent is—

1. The herein described method of manufacturing artificial stone, which consists in mixing lime and sand with water until the resultant mass has the consistency of mortar, then placing such mortar-like mass in a mold and permitting the sand particles to settle compactly into a dense homogeneous mass without application of pressure, until the mass is set, whereby the contained water is retained in the mass, and finally, while the mass is still charged with water, causing such water to act upon the silica of the sand in the presence of the lime to produce a jelly-like substance which is adapted to harden and bind the sand particles together.

2. The herein described method of manufacturing artificial stone, which consists in first mixing lime with water until a thin milky liquid is produced, then adding sand to such liquid until the resultant mass has the consistency of mortar, then placing the mortar-like mass in a mold and permitting the sand particles to settle compactly into a dense homogeneous mass without application of pressure, until the mass is set, whereby the contained water is retained in the mass, and finally, while the mass is still charged with water, causing such water to act upon the silica of the sand in the presence of the lime to produce a jelly-like substance which is adapted to harden and bind the sand particles together.

In testimony whereof, I have signed my name to this specification in the presence of two subscribing witnesses.

SANFRID WILGOTT BERGLUND.

Witnesses:
 ROBERT SPELGREN,
 GUSTAF ISFACE.